United States Patent [19]

Loeliger

[11] Patent Number: 5,029,432
[45] Date of Patent: Jul. 9, 1991

[54] PROCESS AND DEVICE FOR SEALING A CLOSING MEMBRANE ON A SPOUT

[75] Inventor: Willi Loeliger, Konolfingen, Switzerland

[73] Assignee: Nestec S.A., Vevey, Switzerland

[21] Appl. No.: 435,740

[22] Filed: Nov. 13, 1989

[30] Foreign Application Priority Data

Dec. 15, 1988 [CH] Switzerland ............ 4633/88

[51] Int. Cl.⁵ ............ B65B 3/17; B65B 7/02; B32B 31/00
[52] U.S. Cl. ............ 53/469; 53/128.1; 53/268; 53/329; 53/410; 53/479; 156/282; 156/498
[58] Field of Search ........ 53/268, 329, 373, 410, 53/468, 469, 477, 478, 479, 266 R; 156/282, 498

[56] References Cited

U.S. PATENT DOCUMENTS

| | | | |
|---|---|---|---|
| 3,660,965 | 5/1972 | Morera | 53/373 X |
| 3,880,695 | 4/1975 | Standley et al. | 156/282 X |
| 4,120,134 | 10/1978 | Scholle | 53/469 X |
| 4,257,535 | 3/1981 | Mellett | 53/479 X |
| 4,345,412 | 8/1982 | Balzer et al. | 53/373 X |
| 4,360,996 | 11/1982 | Rutter | 53/469 |
| 4,519,184 | 5/1985 | Brunswick | 53/268 X |
| 4,524,563 | 6/1985 | Sassi | 53/373 X |
| 4,625,498 | 12/1986 | Parsons | 53/329 X |
| 4,805,378 | 2/1989 | Anderson | 53/373 X |

FOREIGN PATENT DOCUMENTS 0072699 8/1982 European Pat. Off. .
1514819 3/1967 France .

Primary Examiner—John Sipos
Assistant Examiner—Beth Bianca
Attorney, Agent, or Firm—Vogt & O'Donnell

[57] ABSTRACT

Bags having a spout opening defined by a spout edge surface affixed within the bags are sealed with a spout closure membrane first by pressing the closure membrane against the spout edge surface with a cooled plate. A heating unit which includes a heating element, which has a surface which corresponds in size and shape with the spout edge surface, then is moved adjacent the cooled plate to heat a portion of the cooled plate for sealing the closure membrane to the spout edge surface. After heating the closure membrane for sealing the spout edge surface to the closure membrane, the heating element is moved away from the plate whereby the heated portion of the plate then cools and cools the seal. After the seal is cooled, the plate then is moved away from the sealed spout and bag. The invention also includes displacement systems associated with the plate and heating unit to move them towards and away from the bag and spout and to enable applying pressure to the closure membrane and spout edge surface by means of the plate. The heating unit also includes an insulating body which surrounds the heating element.

15 Claims, 4 Drawing Sheets

PROCESS AND DEVICE FOR SEALING A CLOSING MEMBRANE ON A SPOUT

BACKGROUND OF THE INVENTION

This invention relates to a process for sealing a closure membrane to the inner surface of a spout of a bag filled with liquid. The invention also relates to an apparatus for carrying out this process.

EP 72 699 already describes a system for sealing a closure membrane to a spout. However, the sealing system according to this patent is a system for directly heating the sealing line followed by immediate descent of the heating element. On completion of the sealing process, the heating element is removed when the sealing line is at its hottest and hence at its most fragile. The disadvantage is that the seal is in danger of developing leaks because even slight mechanical stressing of the sealed zone is sufficient to detach the membrane from the spout.

SUMMARY OF THE INVENTION

The object of the present invention is to provide a sealing process and apparatus which enable the disadvantages mentioned above to be eliminated so that the bag containing the liquid is firmly sealed.

The present invention relates to a process for sealing a closure membrane to the inner surface of a spout of a bag filled with liquid, the spout comprising on its outer surface a tearable membrane, wherein a cooled plate larger in size than the spout orifice is pressed against the inner surface of the spout at the end of the filling of the bag, after which a heating element is raised coaxially relative to the cold plate, positioning itself beneath the plate to carry out the sealing process by heat transfer through the plate, and the heating element and finally the plate are lowered again when the seal has cooled.

The present invention also relates to an apparatus for carrying out the process, comprising a first support plate mounted on a first cylindrical body and displaced by a first system, a heating element surrounding the cylindrical body beneath the support plate and an insulating body surrounding the heating element and integral therewith, the heating element and insulating body being mounted on a second cylindrical body and being displaced coaxially relative to the first cylindrical body by a second system, the first system being an integral part of the heating element, the insulating body and the second cylindrical body.

DETAILED DESCRIPTION OF THE INVENTION

The object of the process according to the invention is to keep the membrane in position against the spout until the sealing line has cooled. This object is achieved by a multistep process using the transfer of heat through a plate which is cooled at its centre, but which conducts heat at its periphery. The heating element is of course permanently heated.

Although the shape of the plate and the spout is not critical, a circular spout and plate are preferably used. The plate is cooled at its centre and hot at its periphery when the heating element is raised against the plate.

In the context of the invention, a bag is understood to be a container of a flexible plastics material for food or medical products. The plastics material used is polyester or a laminate based on polyester or any other sealable plastics material compatible with foods.

The term liquid is understood to apply both to aqueous solutions, such as milk, and juices of fruits or vegetables and to more viscous products, such as jam, marmalade and the like, with or without pieces.

The process according to the invention may be carried out with bags of at least two different types, i.e., a bag in which the spout comprises an inner membrane which already adheres partly to the spout at the moment of filling, as in EP 72 699, or a bag with a spout with no inner closure membrane, in which case that part of the membrane of the bag directly opposite the spout is sealed to the spout.

In this second embodiment, it is preferred to avoid any folding of that part of the membrane to be sealed to the spout during the various steps of the process. To this end, the membrane to be sealed is held in position on the cold plate before filling of the bag by means of a system which applies a partial vacuum to the plate. It is important to avoid folds because they are sources of tension during subsequent handling. The vacuum applied to the plate is between $4 \times 10^3$ and $10^4$ Pa.

During application of the vacuum, sealing and cooling, the plate bears against the spout under a pressure of $13 \times 10^5$ to $26 \times 10^5$ Pa.

The temperature of the heating element depends on the type of material to be sealed. It is normally between 120° C. and 320° C. The various steps of the sealing process are explained in detail hereinafter with reference to the accompanying drawings.

An aseptic filling machine of the type described in Swiss patent application 4584/87 filed Nov. 25, 1987 is preferably used for the purposes of the present invention.

In the apparatus of the present invention, it is important that the heating element be surrounded by an insulating body because the insulating body prevents the bag from coming into contact with the heating element.

The first and second displacement systems are preferably pneumatic systems. However, it would also be possible to use hydraulic or mechanical systems.

In the case of pneumatic displacement, the first system comprises a cylinder and a piston and the second system comprises a piston rod externally connected to the cylinder of the first system and a piston displaceable in a movable double cylinder, the second chamber of the double cylinder comprising two interconnected pistons, of which the second piston slides in a fixed cylinder.

The heating element comprises at least two heating resistances to ensure good heat distribution. The constituent material of the heating element is not critical and may be, for example, a metal such as copper or aluminium.

To ensure that the support plate is effectively cooled, a water cooling system is provided in the first cylindrical body. The support plate comprises grooves or reinforcements connected to a vacuum-generating system.

The heating power is not critical. To obtain effective sealing, however, the heating element should have a heating power greater than the cooling of the plate so that the periphery of the plate is hot when the heating element bears against the plate.

The constituent material of the insulating body is not critical and may be a ceramic for example. If very good heat insulation is required, a water cooling system may also be provided in the insulating body.

The invention is described in more detail in the following with reference to the accompanying drawings.

DETAILED DESCRIPTION OF THE DRAWINGS

Figure 1:
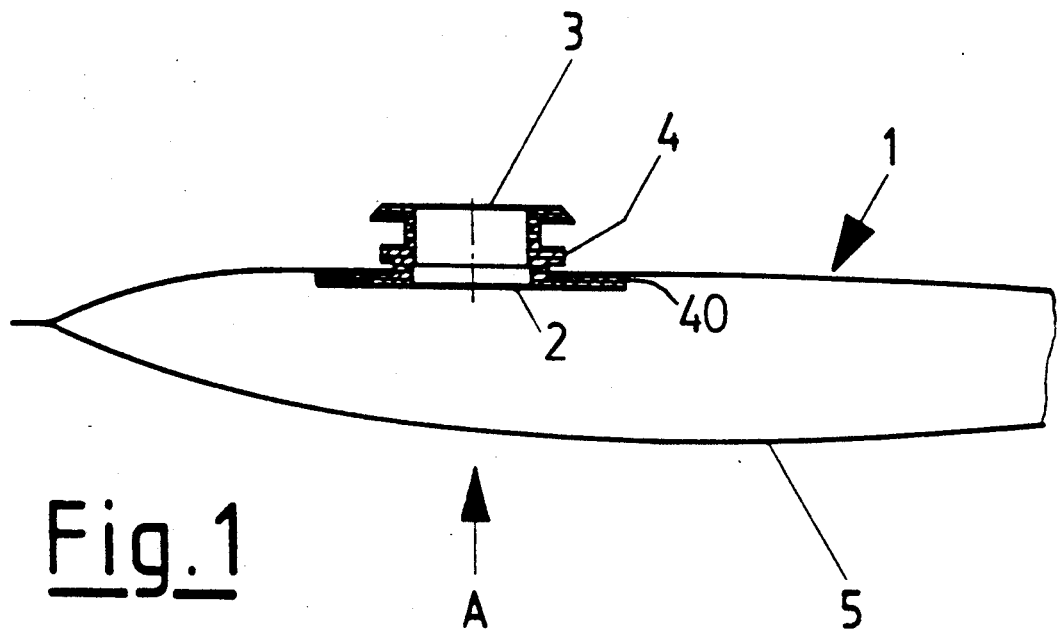
FIG. 1 is a view of the bag in a first embodiment.

The bag (1) comprises a spout (4), a tearable membrane (3) and an inner membrane (2) which already adheres partly to the spout edge surface (40) of spout (4) encompassed by the bag at the moment of filling of the bag. After filling, the sealing unit ascends in the direction A and thus forces back the product accommodated in the bag. The surface (5) of the bag must be made of a material which can be sealed to the inner membrane (2).

Figure 2:
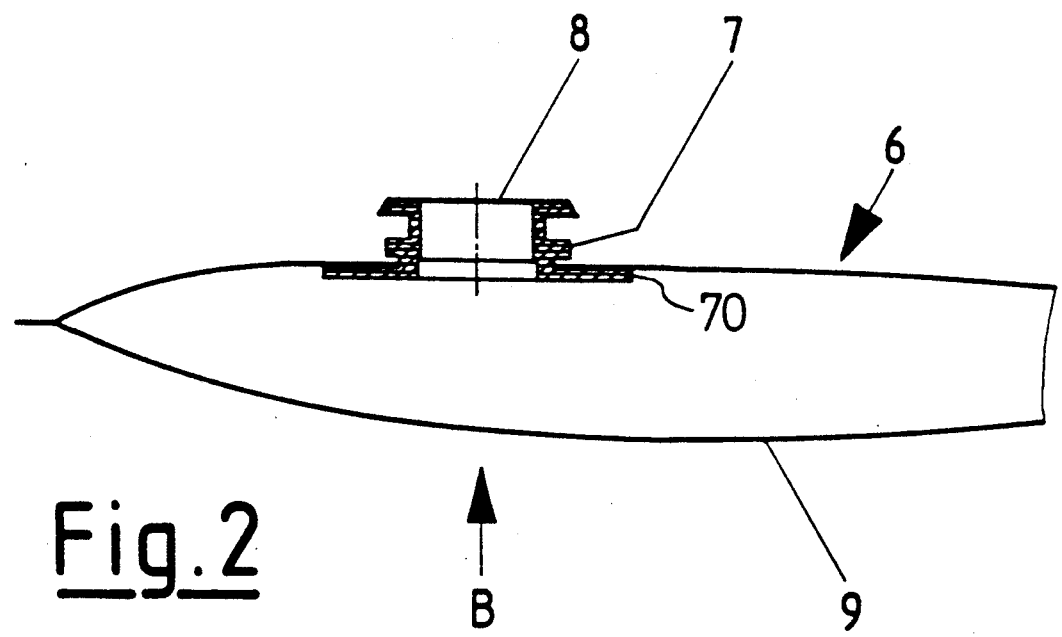
FIG. 2 is a view of the bag in a second embodiment.

FIG. 2 shows a second version of the bag (6) comprising a spout (7) and a tearable membrane (8). In this case, the apparatus according to the invention ascends in the direction B at the moment of sealing and the membrane (9) is sealed to spout edge surface (70) adjacent the inner surface of the spout (7).

Figure 3:
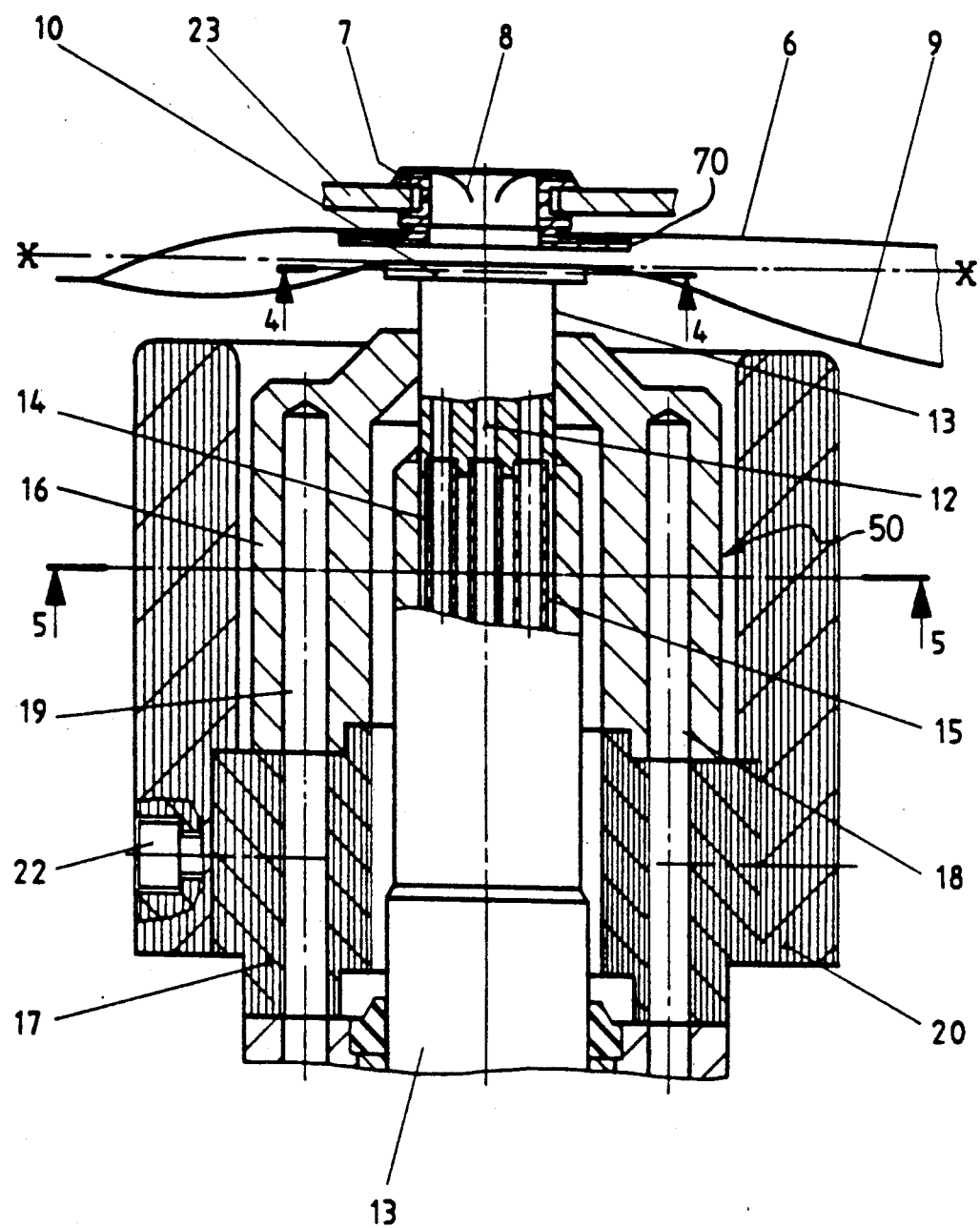
FIG. 3 is a partial section through the upper part of the apparatus according to the invention.
Figure 4:
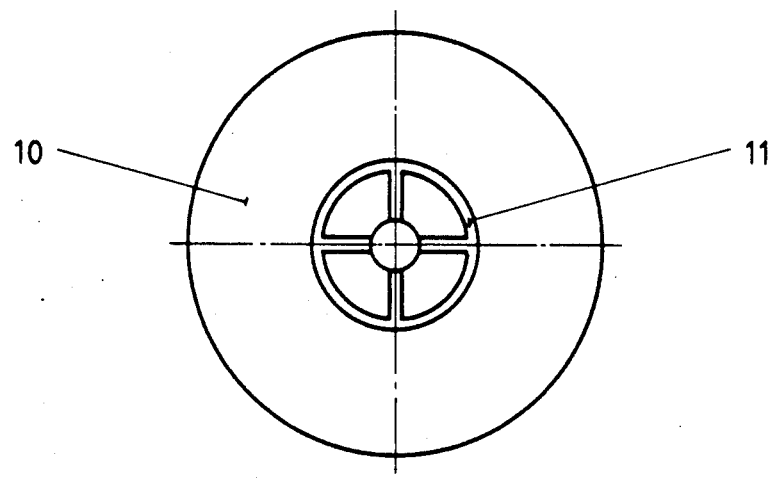
FIG. 4 is a section on the line 4—4 of FIG. 3.
Figure 5:
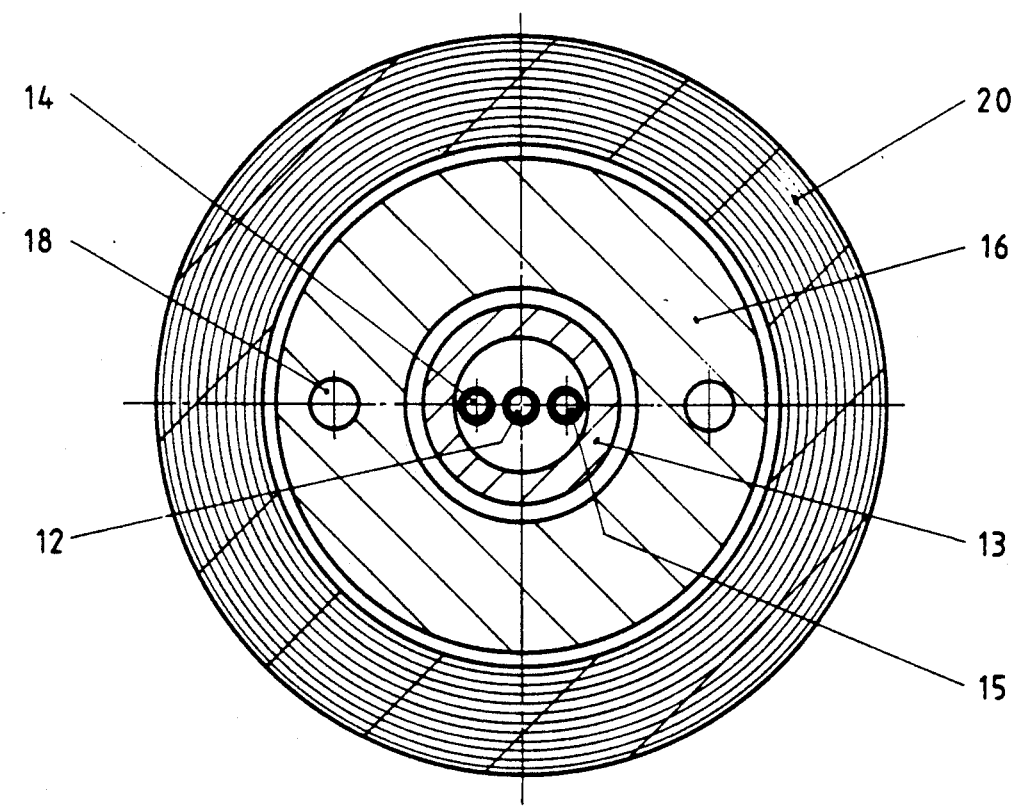
FIG. 5 is a section on the line 5—5 of FIG. 3.

FIG. 3 is a partial section through the upper part of the apparatus according to the invention with a bag according to FIG. 2 but without the aseptic filling unit described in the above-mentioned Swiss patent application 4584/87.

The jaws (23) enable the bag (6) to be held in place. The support plate (10) mounted on a cylindrical body (13) comprises grooves (11) connected by a passage (12) to a vacuum-generating system (not shown), for example a vacuum pump. The cylindrical body additionally comprises water inlet and outlet passages (14) and (15) for cooling the plate (10). The cylindrical body (13) slides in a heating element (16) mounted on an insulating body (17) under the power of a pneumatic system which will be described hereinafter with reference to FIG. 6. The heating unit generally designated by reference numeral (50) includes a heating element (16) and an insulating body (20). The heating element (16) comprises two heating resistances (18, 19) fed with electrical current. The insulating body (20), which is intended to remain cold, surrounds the heating element. As shown in FIG. 3, the insulating body (20) ensures that the bag (6) never comes into contact with the heating element. The elements (16, 17, 20) are mounted on a cylindrical body (21) (FIG. 6) and are displaceable by pneumatic means which will be described hereinafter with reference to FIG. 6. The insulating body (20), which is integral with the heating element (16), is held in place by screws (22) of which only one is shown.

Figure 6:
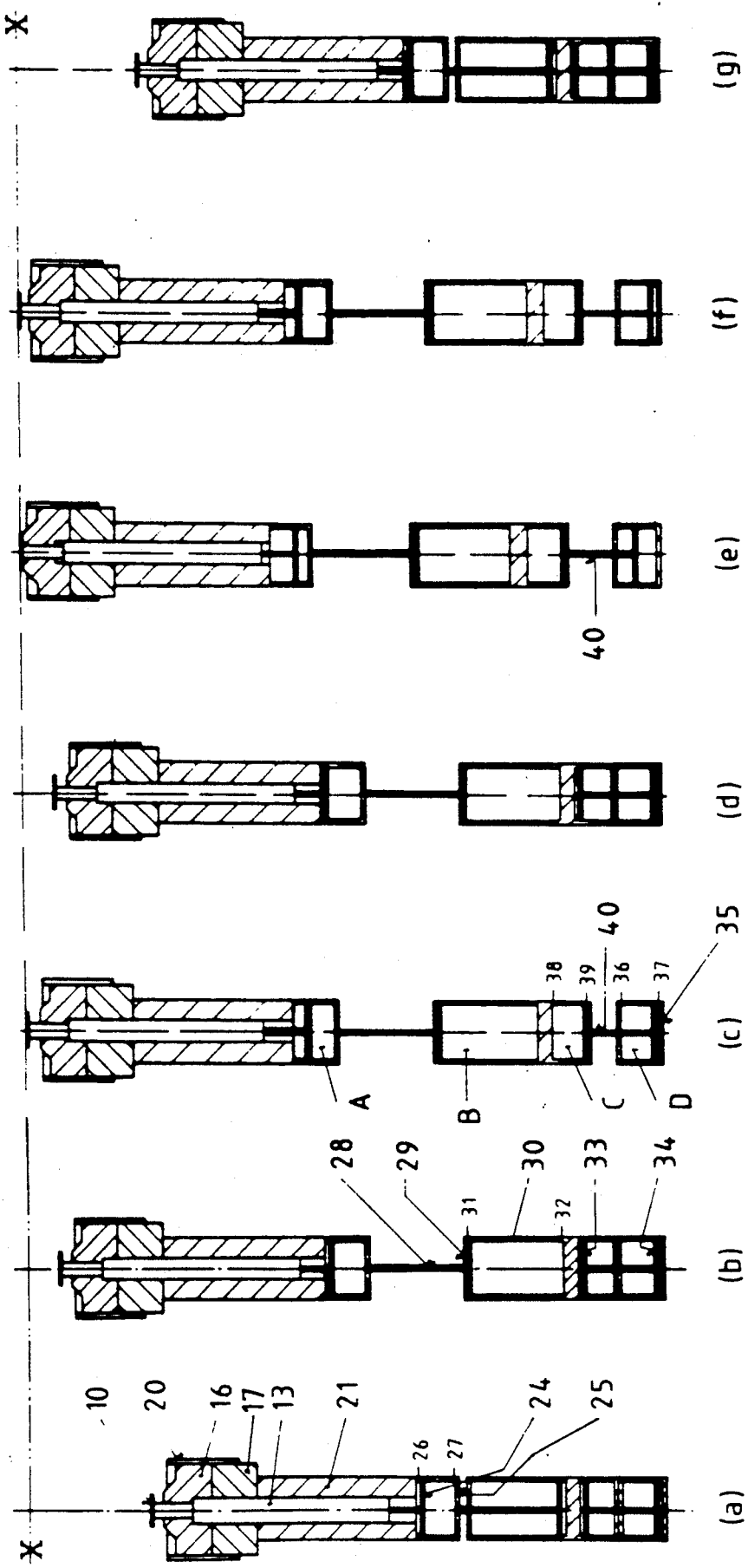
FIG. 6 illustrates the sequence of the various steps of the process according to the invention.

FIG. 6 shows the pneumatic means displacing the elements and the sequence of the various steps involved in the process according to the invention. The line x-x of FIG. 6 is also shown in FIG. 3. FIG. 3 shows the position (f). The cylindrical body (13) is connected to a piston (24) displaceable in a cylinder (25) comprising two air inlets (26) and (27). The heating element (16), the insulating bodies (17) and (20) and the cylindrical body (21) are connected to the rod (28) of a piston (29) displaceable in movable double cylinder (30). The chamber B of the piston (29) comprises air inlets (31) and (32). The second chamber C of the double cylinder comprises a piston (33). The piston (33) is connected by a rod (40) to the piston (34) which slides in a fixed cylinder (35) with the chamber D. The cylinder (35) comprises air inlets (36) and (37). The second chamber C of the double cylinder (30) comprises air inlets (38) and (39).

The steps involved in the process are as follows:
 a) starting position,
 b) sterilization of the outer membrane (8) by the aseptic filling machine (not shown),
 c) application of vacuum to the plate (10) through the passage (12),
 d) tearing of the membrane (8) and filling of the bag by the aseptic filling machine,
 e) rinsing and sealing,
 f) cooling of the seal and
 g) starting position.

The heating element (16) is of course permanently heated and the plate (10) permanently cooled during the various steps.

Thus, as can be seen from the drawing Figures and from the foregoing description, the process and apparatus of the present invention involve sealing an opening of a spout within a bag and which has a spout edge surface (40, 70) FIGS. 1 and 2) affixed within the bag. To effect the closure and sealing, the cooled plate (10), which has first and second planar surfaces which have a size larger than the spout opening and which extend to encompass the size of the spout edge surface to be sealed, is moved for moving the closure membrane (4, 9) adjacent the spout opening defined by the spout edge surface (40, 70). Pressure is applied to the cooled plate so that the first surface of the cooled plate presses the closure membrane (4, 9) against the spout edge surface (40, 70). The heating element (16) of the heating unit (50), whic has a surface which has a size and shape complementary to the size and shape of the spout edge surface, is moved adjacent the second surface of the cooled plate so that through heat ttransfer from the heating element (16) to and through the plate (10), the portion of the plate pressing to the closure membrane against the spout edge surface is heated to seal the closure membrane to the spout edge surface. The heating unit (50) then is removed from the plate (10) whereby the heated portion of the plate then cools, and the seal is cooled by the cooled plate. The cooled plate then is removed away from the sealed spout and bag.

The mode of operation of the apparatus, with particular reference to FIG. 6, is as follows:

To arrive at position a), air is admitted into chamber A at (27), into chamber B at (31), into chamber C at (39) and into chamber D at (36) and the plate (10) is raised. To move into position b), air is admitted into chamber B at (32). The intake of air through (38) gives position c). In this position, the plate (10) is under a vacuum so that the membrane (9) of the bag (6) is drawn against (10) and the bag is unable to move. The position of the membrane (9) thus remains unchanged during the sealing process. To move into position d), air is admitted at (39). Position b) is thus re-assumed, the object being that the plate (19) draws the surface (9) of the bag (6) to remove it from the spout (7). This is the step in which the membrane (8) is torn and the bag (6) filled. On completion of filling, air is admitted through (38) and (37) to bring the apparatus into the sealing position. The air pressure in chamber A is lower than in the other three chambers. Position e) is thus assumed, the plate (10) being in contact with the heating element (16, 17). Heat is transferred to the periphery of the plate (10) because the centre of the plate is permanently cooled by water. This sealing step lasts 1 to 3 seconds. Step f) lasts 1 to 2 seconds and comprises cooling of the seal. To reach position f), air is admitted through (36). Finally, air is admitted at (31) and (39) to return to the starting position. The sequence a) to g) is of course controlled by a programmed electronic unit.

The present invention enables bags to be firmly sealed at a rate compatible with production lines.

We claim:

1. A process for sealing an opening of a spout which has a spout edge surface about the opening affixed within a bag comprising:
   cooling a plate having first and second planar surfaces having a size larger than the spout opening extending to encompass the size of the spout edge surface;
   moving the cooled plate for moving, by means of the first surface, a spout closure membrane adjacent to the spout opening and spout edge surface and then applying pressure to the cooled plate so that the first surface of the cooled plate presses the closure membrane against the spout edge surface;
   moving a heating element coaxially relative to the plate adjacent the second surface of the cooled plate so that, through heat transfer from the heating element to and through the cooled plate, a portion of the plate pressing the closure membrane against the spout edge surface is heated to form a seal between the closure membrane and the spout edge surface;
   moving the heating element away from the plate whereby the heated portion of the plate then cools;
   cooling the seal of the sealed closure membrane and spout edge surface with the cooled plate; and then moving the plate away from the sealed spout and bag.

2. A process according to claim 1 wherein the closure membrane to be sealed to the spout edge surface adheres partly to the spout edge surface and the plate presses a portion of the bag against the closure membrane against for pressing the closure membrane against the spout edge surface.

3. A process according to claim 1 wherein a portion of the bag forms the closure membrane and the plate presses that a portion of the bag against the spout edge surface.

4. A process according to claim 1 wherein the plate applies a pressure of from $3 \times 10^5$ Pa to $26 \times 10^5$ Pa for pressing the closure membrane against the spout edge surface.

5. A process according to claim 1 further comprising pulling a vacuum through the plate so that the closure membrane pressed by the plate is held in position by the plate by the vacuum applied.

6. A process according to claim 5 wherein the vacuum applied is from $4 \times 10^3$ Pa to $10^4$ Pa.

7. A process according to claim 1 wherein the spout edge surface, the surfaces of the plate and the heating element surface are circular in shape.

8. A process according to claim 1 wherein the temperature applied by the heating element is from 120° C. to 320° C.

9. An apparatus for sealing a spout closure membrane to a spout edge surface to seal a spout opening defined by the spout edge surface comprising:
   a plate having two planar surfaces having a size larger than an opening of a spout to be sealed defined by a spout edge surface wherein the surfaces of the plate extend to encompass the size of the spout edge surface and wherein the plate has internal passages disposed within the plate so that the plate may be cooled;
   a heating unit, including a heating element having a surface having a size and shape complementary to a size and shape of the spout edge surface and an insulating body surrounding the heating element, positioned for contacting one planar surface of the plate for heating a portion of the plate for sealing a closure membrane in contact with the other planar surface to the spout edge surface;
   a first displacement system associated with the plate for moving the plate towards and away from the membrane and spout edge surface to be sealed and for applying pressure via the plate to the closure membrane and spout; and
   a second displacement system for moving the heating unit towards and away from the plate for intermittent heating of the plate;

10. An apparatus according to claim 9 wherein the plate is mounted upon a first cylindrical body and associated with the first displacement system, wherein the heating element surrounds the first cylindrical body beneath the plate, and wherein the insulating body surrounds the heating element and wherein the heating element and insulating body are mounted upon a second cylindrical body and associated with the second displacement system for being displaced coaxially relative to the first cylindrical body.

11. An apparatus according to claim 9 or 10 wherein the first displacement system and the second displacement system are pneumatic systems.

12. An apparatus according to claim 9 or 10 wherein the first displacement system comprises a cylinder and a piston and the second displacement system comprises a piston rod connected to the first displacement system and a piston displaceable in a movable double cylinder having a first chamber and a second chamber comprised of a piston connected by a rod to a piston sliding in a fixed cylinder.

13. An apparatus according to claim 9 or 10 wherein the heating element has at least two heating resistances.

14. An apparatus according to claim 10 wherein the first cylindrical body further includes a water cooling system.

15. An apparatus according to claim 9 wherein said other planar surface has grooves and further comprising a vacuum generating system connected to the grooves so that the closure membrane is held in position by the plate by applying a vacuum from the system through the grooves.

* * * * *